(12) United States Patent
Hartman et al.

(10) Patent No.: US 8,435,387 B2
(45) Date of Patent: May 7, 2013

(54) SMALL-SCALE METHOD AND APPARATUS FOR SEPARATING MIXTURES

(75) Inventors: Ryan L. Hartman, Arlington, MA (US); Hemantkumar R. Sahoo, Houston, TX (US); Klavs F. Jensen, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 630 days.

(21) Appl. No.: 12/617,984

(22) Filed: Nov. 13, 2009

(65) Prior Publication Data

US 2010/0122899 A1    May 20, 2010

Related U.S. Application Data

(60) Provisional application No. 61/114,975, filed on Nov. 14, 2008.

(51) Int. Cl.
*B01D 1/0041* (2011.01)
*B01D 3/009* (2011.01)
*B01J 19/0093* (2011.01)

(52) U.S. Cl.
USPC .......... 203/28; 95/227; 203/71; 203/99; 210/634; 210/664; 210/739; 210/767; 210/775; 210/806; 261/2; 261/128; 422/4

(58) Field of Classification Search .......... 203/2, 28, 203/71, 99; 95/227; 210/634, 664, 739, 210/767, 775, 718, 719, 806; 422/4; 261/2, 261/128
See application file for complete search history.

(56) References Cited

U.S. PATENT DOCUMENTS 5,304,287 A    4/1994 Stieg
6,652,627 B1 *  11/2003 Tonkovich et al. ............ 95/104
(Continued)

FOREIGN PATENT DOCUMENTS

EP    1 380 337 A2    1/2004
EP    1 941 941 A1    7/2008
(Continued)

OTHER PUBLICATIONS

Harries, N. et al., "A Numerical Model for Segmented Flow in a Microreactor", International Journal of Heat and Mass Transfer, vol. 46, 2003, pp. 3313-3322.*

(Continued)

*Primary Examiner* — Virginia Manoharan
(74) *Attorney, Agent, or Firm* — Wolf, Greenfield & Sacks, P.C.

(57) ABSTRACT

The present invention generally relates to the small-scale separation of a mixture of two or more components with different boiling points into enriched fractions. In some embodiments, a first and second fluid (e.g., a liquid and a gas, a liquid and a liquid, etc.) are passed through a channel. The first fluid may include at least two components, each with a unique boiling point. Upon contacting the first and second fluids within the channel, at least a portion of the most volatile of the components in the first fluid (i.e., the component with the lowest boiling point) may be transferred from the first fluid to the second fluid. In some instances, the transfer of the volatile component(s) from the first fluid to the second fluid may be expedited by heating, in some cases above the boiling point(s) of the component(s) to be transferred from the first fluid to the second fluid. Contact between the first and second fluids may be maintained, for example, via segmented flow, bubbling flow, etc. In some instances, separation between the first and second fluids may be maintained in a channel that is essentially free of interior microchannel surface irregularities.

27 Claims, 13 Drawing Sheets

U.S. PATENT DOCUMENTS

| | | | |
|---|---|---|---|
| 6,989,134 | B2 | 1/2006 | Tonkovich et al. |
| 7,129,091 | B2 * | 10/2006 | Ismagilov et al. ............ 436/34 |
| 7,195,872 | B2 * | 3/2007 | Agrawal et al. ............ 435/287.2 |
| 7,305,850 | B2 * | 12/2007 | Tonkovich et al. ............ 62/617 |
| 7,344,576 | B2 * | 3/2008 | TeGrotenhuis et al. ......... 55/319 |
| 7,610,775 | B2 * | 11/2009 | Tonkovich et al. ............ 62/617 |
| 8,075,778 | B2 * | 12/2011 | Guenther et al. ............ 210/649 |
| 2003/0152488 | A1 | 8/2003 | Tonkovich et al. |
| 2005/0229553 | A1 | 10/2005 | TeGrotenhuis et al. |
| 2006/0016216 | A1 | 1/2006 | Tonkovich et al. |
| 2006/0249020 | A1 | 11/2006 | Tonkovich et al. |
| 2008/0058434 | A1 | 3/2008 | Tonkovich et al. |
| 2008/0275653 | A1 | 11/2008 | Cypes et al. |
| 2009/0178560 | A1 * | 7/2009 | Rekers et al. ............ 95/143 |
| 2009/0298092 | A1 * | 12/2009 | Tsai et al. ............ 435/7.2 |
| 2009/0326279 | A1 * | 12/2009 | Tonkovich et al. ............ 568/487 |

FOREIGN PATENT DOCUMENTS

| | | |
|---|---|---|
| GB | 2 433 448 A | 6/2007 |
| WO | WO 99/22857 A1 | 5/1999 |
| WO | WO 2005/068065 A1 | 7/2005 |
| WO | WO 2007/032810 A2 | 3/2007 |
| WO | WO 2007/033335 A1 | 3/2007 |

OTHER PUBLICATIONS

Burns, J.R. et al., "The Intensification of Rapid Reactions in Multiphase Systems Using Slug | Flow in Capillaries", Lab on a Chip, vol. 1, 2001 pp. 10-15.*

International Search Report and Written Opinion from PCT Application PCT/US2009/006088 dated Jun. 10, 2010.

Günther, A., et al. "Transport and reaction in microscale segmented gas-liquid flow," *The Royal Society of Chemistry, Lab Chip*, 2004, 4, 278-286.

Günther, A., et al. "Multiphase Microfluidics: from Flow Characteristics to Chemical and Material Synthesis," *Lab Chip*, 2006, 6, 1487-1503.

Hartman, R., et al. "Multi-step Microchemical Synthesis enabled by Microfluidic Distillation," *Agnew. Chem. Int. Ed.*, 2010, 49, 899-903.

Hartman, R., et al. "Microchemical systems for continuous-flow synthesis," *Lab Chip*, 2009, 9(17), 2495-2507.

Hartman, R., et al. "Distillation in microchemical systems using capillary forces and segmented flow," *Lab Chip*, 2009, 9(13), 1843-1849.

Sahoo, H.R., et al. "Multistep Continuous-Flow Microchemical Synthesis Involving Multiple Reactions and Separations," *Angew. Chem. Int. Ed.*, 2007, 46, 5704-5708.

Timmer, B.H., et al. "Micro-evaportion electrolyte concentrator," *Sensors and Actuators B 91*, 2003, 342-346.

Wootton, R., et al. "Continuous laminar evaporation: micron-scale distillation," *The Royal Society of Chemistry, Chem. Commun.*, 2004, 266-267.

Zhang, Y., et al. "Vacuum membrane distillation on a microfluidic chip," *Chem. Commun.*, 2009, 2750-2752.

* cited by examiner

SMALL-SCALE METHOD AND APPARATUS FOR SEPARATING MIXTURES

RELATED APPLICATIONS

This application claims the benefit of U.S. Provisional Patent Application Ser. No. 61/114,975, filed Nov. 14, 2008, entitled "Small-Scale Method and Apparatus for Separating Mixtures," by Hartman, et al., which is incorporated herein by reference in its entirety.

FIELD OF THE INVENTION

The present invention generally relates to systems and methods for the small-scale separation of two or more components with different boiling points into enriched fractions.

BACKGROUND

Many industries in the fields of biotechnology, fine chemicals, and pharmaceuticals are employing microfluidic processes for a variety of reasons including high speed operation, safety, and waste reduction. Specifically, there is an interest in the use of microsystems for continuous organic synthesis that has applications in the pharmaceutical, fine chemicals, and perfumery industry. Organic multi-step syntheses using microchannels promises to increase the speed of chemistry research and thus, impact drug discovery and catalyst screening.

Continuous reaction and separation schemes using bubble point separation techniques have been difficult to achieve at the microscale. In microsystems, surface forces are dominant. Therefore, boiling liquids to achieve vapor-liquid equilibrium presents a variety of challenges.

Accordingly, improved materials and methods are needed.

SUMMARY OF THE INVENTION

The present invention relates generally to the small-scale separation of mixtures. The subject matter of the present invention involves, in some cases, interrelated products, alternative solutions to a particular problem, and/or a plurality of different uses of one or more systems and/or articles.

In one set of embodiments, a method of at least partially separating components is provided. The method can comprise, in some embodiments, passing a first fluid through a microchannel, wherein the first fluid comprises a first component with a first boiling point and a second component with a second boiling point that is higher than the first boiling point. In some cases, the method can further comprise passing a second fluid, largely separate from the first fluid, through the microchannel in combination with the first fluid, wherein the second fluid contains at least one component that is substantially absent from the first fluid. In some instances, the method can further comprise heating the fluids within the microchannel to a temperature at or above the boiling point of the first component, thereby transferring at least some of the first component to the second fluid.

In one set of embodiments, the method can comprise passing a first fluid through a microchannel, wherein the first fluid comprises a first component with a first boiling point and a second component with a second boiling point that is higher than the first boiling point; passing a second fluid, largely separate from the first fluid, through the microchannel, wherein the second fluid contains at least one component that is substantially absent from the first fluid; and heating the fluids within the microchannel to a temperature at or above the boiling point of the first component, thereby transferring at least some of the first component to the second fluid, wherein the Bond number of the system is less than about 1.

In some instances, the method can comprise passing a first fluid through a microchannel essentially free of interior microchannel surface irregularities, wherein the first fluid comprises a first component with a first boiling point and a second component with a second boiling point that is higher than the first boiling point. The method can further comprise, in some cases, passing a second fluid, largely separate from the first fluid, through the microchannel, wherein the second fluid contains at least one component that is substantially absent from the first fluid. In some instances, the method can further comprise heating the fluids within the microchannel to a temperature at or above the boiling point of the first component, thereby transferring at least some of the first component to the second fluid.

In some embodiments, the method can comprise passing a first fluid through a microchannel, wherein the first fluid comprises a first component with a first boiling point and second component with a second boiling point that is higher than the first boiling point; passing a second fluid, largely separate from the first fluid, through the microchannel as a series of slugs in a segmented flow configuration with the first fluid; allowing at least some of the first component to be transferred from the first fluid to the second fluid; and separating at least a portion of the first fluid from the second fluid.

The method can comprise, in some cases, feeding a first fluid to a microchannel through a first inlet, wherein the first fluid comprises a first component with a first boiling point and a second component with a second boiling point that is higher than the first boiling point; feeding a second fluid, largely separate from the first fluid, to the microchannel through a second inlet; passing the fluids in combination with each other through the microchannel; and heating the fluids within the microchannel to a temperature at or above the boiling point of the first component, thereby transferring at least some of the first component to the second fluid.

In some instances, the method can comprise feeding a first fluid to a microchannel through a first inlet, wherein the first fluid comprises a first component with a first boiling point and a second component with a second boiling point that is higher than the first boiling point; feeding a second fluid, largely separate from the first fluid, to the microchannel through a second inlet; flowing the fluids through the microchannel; and heating the fluids within the microchannel to a temperature at or above the boiling point of the first component, thereby transferring at least some of the first component to the second fluid, wherein the Bond number of the system is less than about 1.

The method can comprise, in some embodiments, feeding a first fluid to a microchannel essentially free of interior microchannel surface irregularities through a first inlet, wherein the first fluid comprises a first component with a first boiling point and a second component with a second boiling point that is higher than the first boiling point; feeding a second fluid, largely separate from the first fluid, to the microchannel through a second inlet; flowing the fluids through the microchannel; and heating the fluids within the microchannel to a temperature at or above the boiling point of the first component, thereby transferring at least some of the first component to the second fluid.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

The present invention generally relates to the small-scale separation of a mixture of two or more components with different boiling points into enriched fractions. In some embodiments, a first and second fluid (e.g., a liquid and a gas, a liquid and a liquid, etc.) are passed through a channel. The first fluid may comprise at least two components, each with a unique boiling point. Upon contacting the first and second fluids within the channel, at least a portion of the most volatile of the components in the first fluid (i.e., the component with the lowest boiling point) may be transferred from the first fluid to the second fluid. In some instances, the transfer of the volatile component(s) from the first fluid to the second fluid may be expedited by heating, in some cases above the boiling point(s) of the component(s) to be transferred from the first fluid to the second fluid. Contact between the first and second fluids may be maintained, for example, via segmented flow, bubbling flow, sheath flow, etc. In some instances, separation between the first and second fluids may be maintained in a channel that is essentially free of interior channel surface irregularities.

Fields in which the articles and methods described herein may be useful include, but are not limited to, pharmaceuticals, perfumes, bioanalytics, commercial laboratory analytics, commodity chemicals (e.g., olefins), hazardous chemicals, refining, and general chemical separations, among others. In some embodiments, the systems and methods described herein can be used as part of a solvent exchange process (e.g., removing substantially all of one solvent from a mixture and replacing it with another solvent). Systems and methods described herein may have particular application in the microscale. Operation in the microscale provides several advantages including, for example, fast heat transport, fast mixing, reduced mass transport limitations, and large interfacial areas. For example, controlled flashing of liquids in microsystems enables maximized heat dissipation from microelectronic devices (e.g., microprocessors, memory storage devices, etc.) and energy storage devices (e.g., batteries, microfuel cell processors, etc.). In some cases, the Bond number of the system is less than about 1, indicating that surface forces, rather than gravitational forces, dominate the system dynamics.

Figure 1:
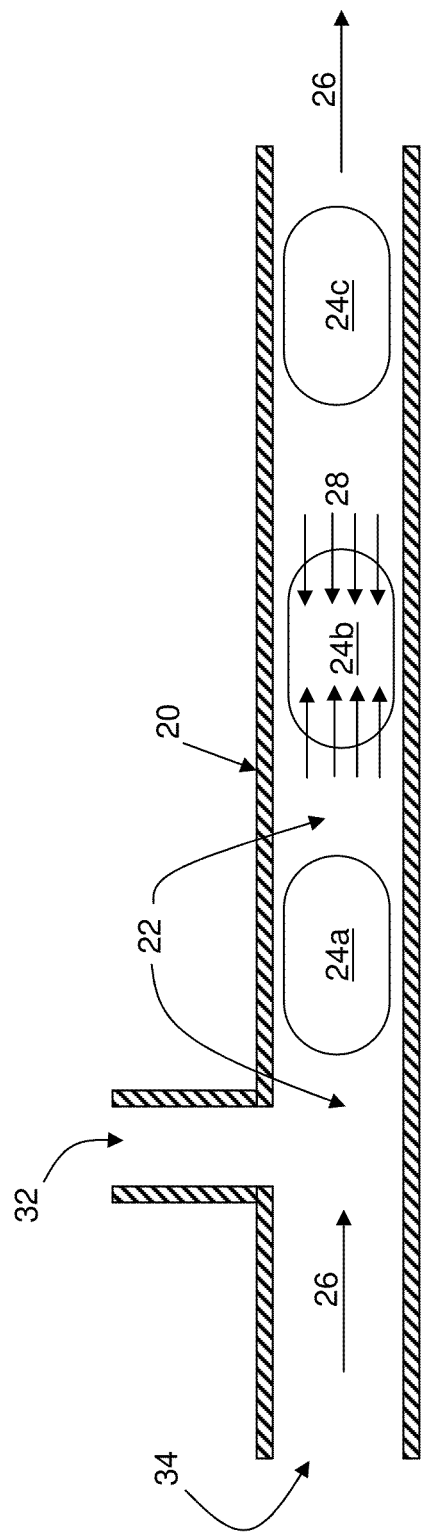
FIG. 1 includes a schematic illustration of a method and apparatus used to separate components, according to one set of embodiments.

One aspect the invention relates to a method of at least partially separating two or more components. FIG. 1 includes a schematic illustration of a separation method according to one set of embodiments. In this example, two fluids are transported through a channel 20. The channel may be, in some embodiments, a microfluidic channel. First fluid 22 can contain a first component and a second component (e.g., miscible components that one desires to separate). In this set of embodiments, the first component has a first boiling point while the second component has a second boiling point that is higher than the first boiling point (i.e., the second component is less volatile than the first component). Second fluid 24, largely separate from the first fluid, can be passed in combination with the first fluid in the direction of arrow 26. Two fluids are said to be "largely separate" from each other when they form two distinct phases (e.g., two substantially immiscible liquids, a gas and a liquid, etc.). In some embodiments, the first and second fluids may both comprise a liquid. In some instances, the first fluid may comprise a liquid while the second fluid comprises a gas.

In some embodiments, the first fluid is fed to the channel through a first inlet, and the second fluid is fed to the channel through a second inlet. In some embodiments, the first and second inlets can be the same. For example, in FIG. 1, first fluid 22 and second fluid 24 can both be fed to the channel through inlet 32, in some cases. In some embodiments, the first and second inlets can be different. For example, in some embodiments, first fluid 22 can be fed to the channel through first inlet 32, and second fluid 24 can be fed to the channel through second inlet 34 (or vice-versa).

In some embodiments, the second fluid can contain at least one component that is substantially absent from the first fluid. For example, in some cases, the second fluid may comprise an inert gas such as nitrogen, argon, helium, etc. In some such embodiments, the inert gas may be substantially absent from the mixture of components to be separated (e.g., a mixture of reaction products, etc.). One of ordinary skill in the art would understand that, although a small portion of a component may be dissolved within a fluid in some cases (e.g., upon exposing nitrogen gas to an aqueous solvent), that component would still be considered to be substantially absent from the fluid. In some embodiments, the second fluid can comprise a component that is substantially immiscible with the first fluid.

In some cases, the second fluid may comprise one or more reactive gases (e.g., oxygen, hydrocarbons, or any other reactive gas). Illustrative examples of liquids that may be used in the systems and methods described herein include, but are not limited to, hydrocarbons, alcohols, aromatic compounds, water, or any other liquid. The liquids may be inert or reactive, as desired.

The second fluid forms, in FIG. 1, a series of slugs ($24a$, $24b$, and $24c$) within the first fluid. While segmented flow is illustrated in this example, other fluid flow regimes could be used as well such as, for example, sheath flow, bubbling flow, etc., which are described in detail below. In the set of embodiments shown in FIG. 1, the first and second fluids are shown as flowing through the micro-channel in combination with each other (i.e. in co-current flow), although the two fluids may be passed in counter-current configurations in other embodiments.

In some instances, first slug $24a$ may be substantially free of both the first and second components. As a specific example, the first slug may be contain purified nitrogen gas. In other cases, first slug $24a$ may comprise a small amount of the first component (i.e., the most volatile component).

As the first and second fluids are transported through the channel, at least some of the first component within the first fluid can be transferred across the fluid-fluid interface to the second fluid. In FIG. 1, transfer of at least some of the first component from the first fluid into second slug $24b$ is indicated by arrows 28. In addition, at least some of the second component (i.e., the less volatile component) may also be transferred from the first fluid to the second fluid (e.g., second slug $24b$).

The transfer of first component from the first fluid to the second fluid may continue along the length of the channel until equilibrium is reached. For example, when one fluid is a gas and the other fluid is a liquid, equilibrium may comprise vapor-liquid equilibrium. In such cases, equilibrium may be reached once the partial pressure of the first component within the second fluid is equal to the vapor pressure of the first component at the temperature of the second fluid. Similarly, the second component may also be transferred from the first fluid to the second fluid until equilibrium, which may occur, for example, once the partial pressure of the second component within the second fluid is equal to the vapor pressure of the second component at the temperature of the second fluid. In cases where the boiling point of the first component is lower than that of the second component, a relatively larger number of moles of the first component may be transferred from the first fluid to the second fluid. Thus, the second fluid may comprise a higher concentration of the first component than the first fluid. Additionally, the first fluid may comprise a higher concentration of the second component than the second fluid. The first and second fluids may be, in some cases, separated from each other, as will be described in more detail later.

Figure 2:
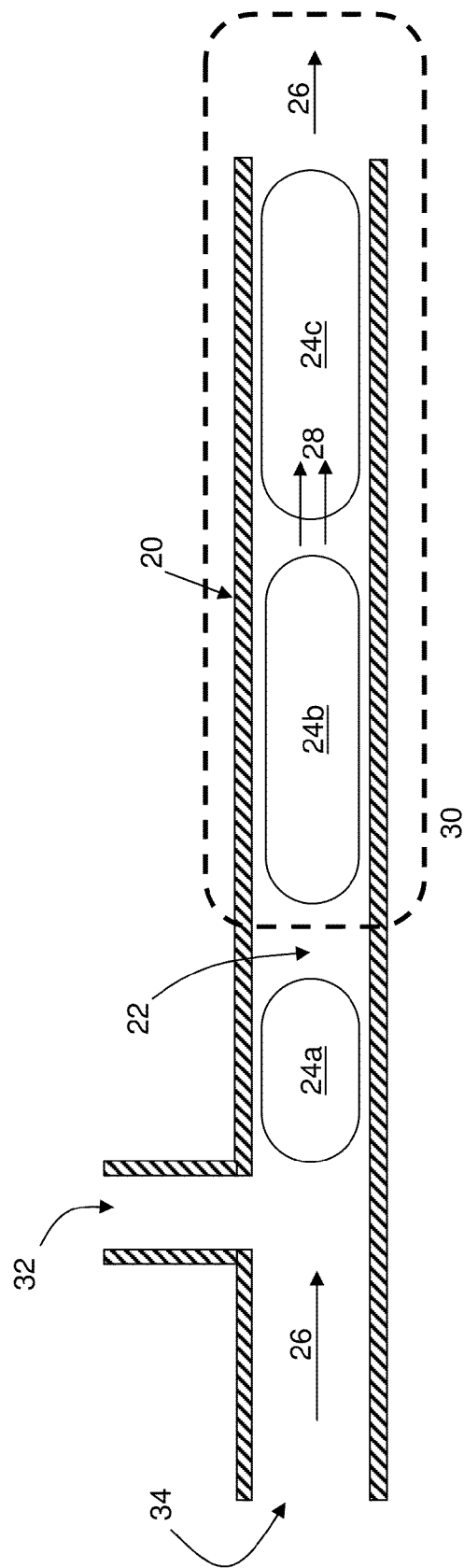
FIG. 2 includes a schematic illustration, according to one set of embodiments, of another method and apparatus used to separate components.

In some embodiments, at least a portion of the fluids within the channel may be heated. For example, fluids in the channel may be heated to a temperature at or above the boiling point of at least one of the components in the first fluid (e.g., the most volatile component in the first fluid). In some embodiments, the first and second components can be substantially absent from the second fluid prior to heating the first and second fluids. FIG. 2 includes a schematic illustration of a method of separating components according to one set of embodiments in which the fluids in the channel are heated. In FIG. 2, a first fluid 22 and a second fluid 24 are transported in combination through a channel 20 in a segmented flow configuration. While segmented flow is illustrated in this example, other fluid flow regimes could be used as well such as, for example, sheath flow, bubbling flow, etc. As the first and second fluids are transported through the channel, at least some of the component can be transferred from the first fluid to the second fluid, as indicated by arrows 28. In addition, heating zone 30 (indicated by the dashed line in FIG. 2) can be used to heat the fluids within the channel, for example, to a temperature above the boiling point of the first component.

Heating the fluids within the channel above the boiling point of at least one component may in some case increase the efficiency with which one of more components is separated from the first fluid. For example, when the first fluid is a liquid and the second fluid is a gas, heating the fluids above the boiling point of the first component may produce vapor-liquid equilibrium very quickly (e.g., in less than about 5 seconds, in less than about 1 second, in less than about 0.1 seconds, or more quickly). In some embodiments, the heating of the fluids as outlined in FIG. 2 may be performed in order to flash vaporize one or more components from the first fluid (e.g., a continuous liquid phase) into the second fluid (e.g., a discontinuous vapor phase such as gas slugs). Operating at or above the bubble point temperature(s) of one or more components within the first fluid may allow for the flashing of volatile components at the fluid-fluid interface (e.g., a vapor-liquid interface). If the first fluid contains, for example, a pure liquid, the liquid may be completely flashed into vapor. If the first fluid contains a mixture of volatile components, the mixture may be partially flashed.

When gases are transported through the channel, the gas phases may increase in volume as they are heated, as shown by the volume increase between slugs $24a$ and $24b$ in FIG. 2.

While the embodiments illustrated in FIGS. 1-2 included the separation of two components, the methods described herein may be extended to the separation of three or more components. For example, in one set of embodiments, the first fluid may contain three components. The heating zone may be heated to a temperature above the boiling point of one component, resulting in the enrichment of the second fluid in that component. In other embodiments, the heating zone may be heated to a temperature above the boiling points of two of the three components. In still further embodiments, the first fluid may comprise four, five, six, or more components, and the fluids may be heated to a temperature above the boiling points of any number of the components.

In some embodiments, the systems and methods described herein may be used to achieve at least partial separation of components with similar boiling points. For example, in some cases, the boiling points of the first and second components may be within about 25° C. of each other. In other cases, the boiling points of the first and second components may be within about 10° C., within about 5° C., within about 1° C., within about 0.5° C., within about 0.1° C., or closer. In some embodiments, the difference between the boiling points of the first and second components may be between about 0.1° C. and about 25° C., between about 0.1° C. and about 10° C., between about 0.1° C. and about 5° C., between about 0.1° C. and about 1° C., between about 0.1° C. and about 0.5° C., between about 0.5° C. and about 25° C., between about 0.5° C. and about 10° C., between about 0.5° C. and about 5° C., or between about 0.5° C. and about 1° C.

In some embodiments, the Bond number of the separation system is less than about 1. The Bond number is a dimensionless number expressing the ratio of body forces (e.g., gravitational forces) to surface tension forces. As used herein, the Bond number is defined using the gravitational acceleration in the system, and is expressed as:

$$Bo = \frac{\rho g L^2}{\gamma} \quad [1]$$

where rho is the density of the fluid, g represents gravitational acceleration (i.e., 9.8 m/s$^2$), L is the cross-sectional dimension of the channel in the area of interest (e.g., the largest cross-sectional dimension), and gamma is the surface tension at the fluid/channel interface. In some embodiments, the Bond number for the system is less than about 1, signifying that surface tension forces exerted on the fluids are larger than the gravitational forces exerted on the fluids. In some cases, the Bond number for the system is less than about 0.5, less than about 0.1, less than about 0.05, less than about 0.01, less than about 0.005, less than about 0.001, or smaller.

In some embodiments, the first and second fluids may be transported through a channel (e.g., a microchannel) essentially free of channel surface irregularities (or microchannel surface irregularities). As used herein, channel and microchannel "surface irregularities" describe features that extend out from or into the surface of a channel or microchannel, for example, a distance equal to or greater than about 5% of the largest cross-sectional dimension of the channel or microchannel. For instance, channel surface irregularities may comprise a set of rods that extend from the channel wall into the bulk of the channel that may, for example, retain a liquid against the surface of the channel via capillary forces. It should be noted that channel or microchannel surface irregularities are different than conventional nano-, or micro-scale surface roughness that may arise during conventional fabrication procedures.

The systems and methods described herein may be used as part of a reactive distillation process. For example, in some instances, the one or more components (e.g., the first component) transferred from the first fluid to the second fluid may be products of a chemical reaction that occurs within the first fluid. The chemical reaction may occur, for example, as a decomposition reaction involving a second component in the first fluid. In other cases, the chemical reaction may be between second and third (or more) components within the first fluid. In some embodiments, the chemical reaction may be an equilibrium reaction, and the disproportionate transfer of one or more components from the first fluid to the second fluid may drive the reaction toward the production of the transferred component(s). As a specific example, a first and second fluid may be transported through a channel. The first fluid may comprise a first and second reactant. The first and second reactants may partially react (e.g., to an equilibrium point) to form a product within the first fluid. The product may be more volatile that one or more of the reactants. Thus, a relatively large portion of the reaction product, compared to one or more of the reactants, may be transferred from the first fluid to the second fluid, producing a first fluid relatively lean in reaction product. The disproportionate transfer of the reaction product may drive the first and second reactants to react further and produce additional product within the first fluid.

Figure 3A:
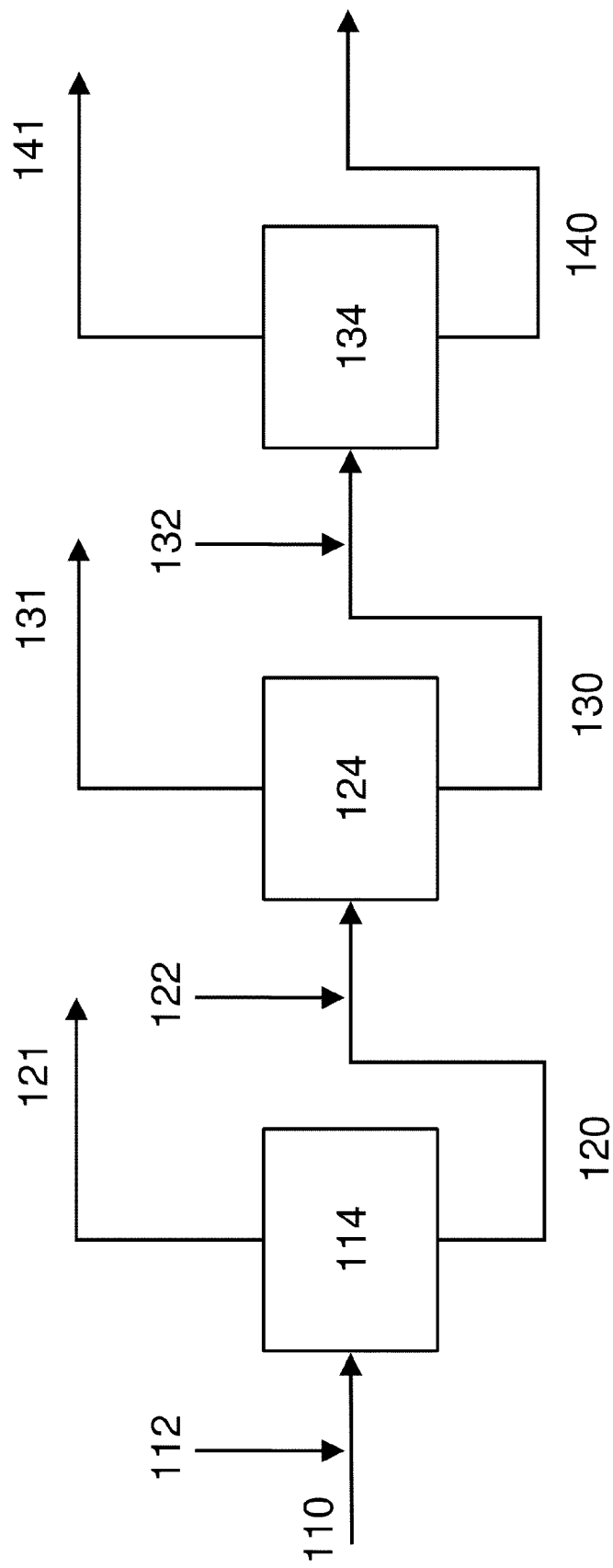
FIGS. 3A-3C include, according to one set of embodiments, schematic illustrations of multi-stage separation processes.

In some embodiments, multi-stage separation may be achieved by transporting fluids through more than one channel. Multi-stage separation techniques are illustrated, for example, in FIGS. 3A-3C. In one set of embodiments, illustrated in FIG. 3A, a first fluid 110 comprising two (or, in some embodiments, more) components may be transported with a second fluid 112 through a first channel 114 (e.g., a microfluidic channel). The two fluids may be optionally heated, for example, to a temperature above the boiling point of the most volatile component in the first fluid. As the fluids are transported through the first channel, at least some of the most volatile component may be transferred from the first fluid to the second fluid, thereby enriching the second fluid in the most volatile component relative to the first fluid (leaving a first fluid lean in the most volatile component). The first and second fluids may then be separated into fluid streams 120 (corresponding to the first fluid lean with respect to the most volatile component) and 121 (corresponding to the second fluid rich in the most volatile component).

Fluid stream 120, still comprising the two components, may be transported with a third fluid 122 through a second channel 124. The two fluids may be optionally heated, for example, to a temperature above the boiling point of the most volatile component in the first fluid. At least some of the most volatile component may be transferred from the first fluid to the third fluid, thereby enriching the third fluid in the most volatile component relative to the first fluid (and further reducing the concentration of the most volatile component within the first fluid). The first and third fluids may then be separated into fluid streams 130 (corresponding to the first fluid) and 131 (corresponding to the third fluid).

Fluid stream 130, still comprising the two components, may be transported with a fourth fluid 132 through a third channel 134. The two fluids may be optionally heated, for example, to a temperature above the boiling point of the most volatile component in the first fluid. At least some of the most volatile component may be transferred from the first fluid to the fourth fluid, thereby enriching the fourth fluid in the most volatile component relative to the first fluid (and even further reducing the concentration of the most volatile component within the first fluid). The first and fourth fluids may then be separated into fluid streams 140 (corresponding to the first fluid) and 141 (corresponding to the fourth fluid). The incorporation of additional stages may subsequently reduce the concentration of the most volatile component within the first fluid even further. In some embodiments, the number of stages is selected such that the concentration of one of the components within one of the fluids is reduced to a desirable level.

Figure 3B:
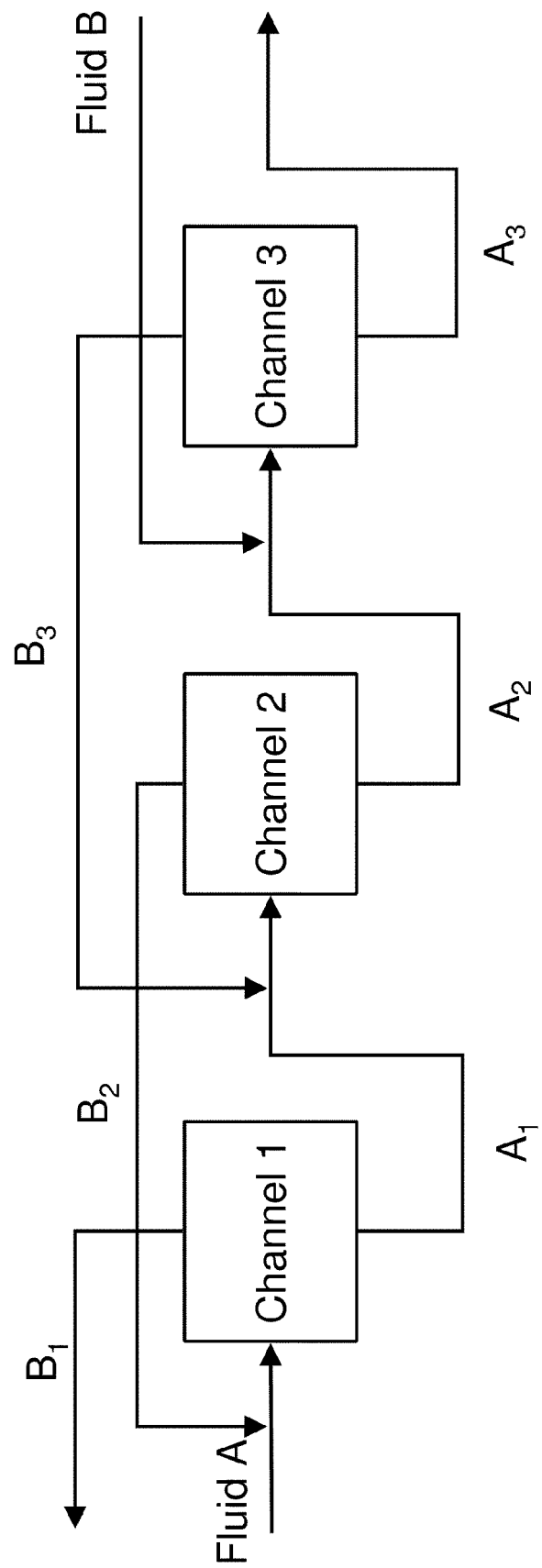

FIG. 3B includes a schematic illustration of another set of embodiments which utilize multi-stage separation. In this set of embodiments, the two fluids that are transported through each channel originate from either side of the channel. The channels on the ends can be fed with one fresh fluid that does not originate from a channel.

Figure 3C:
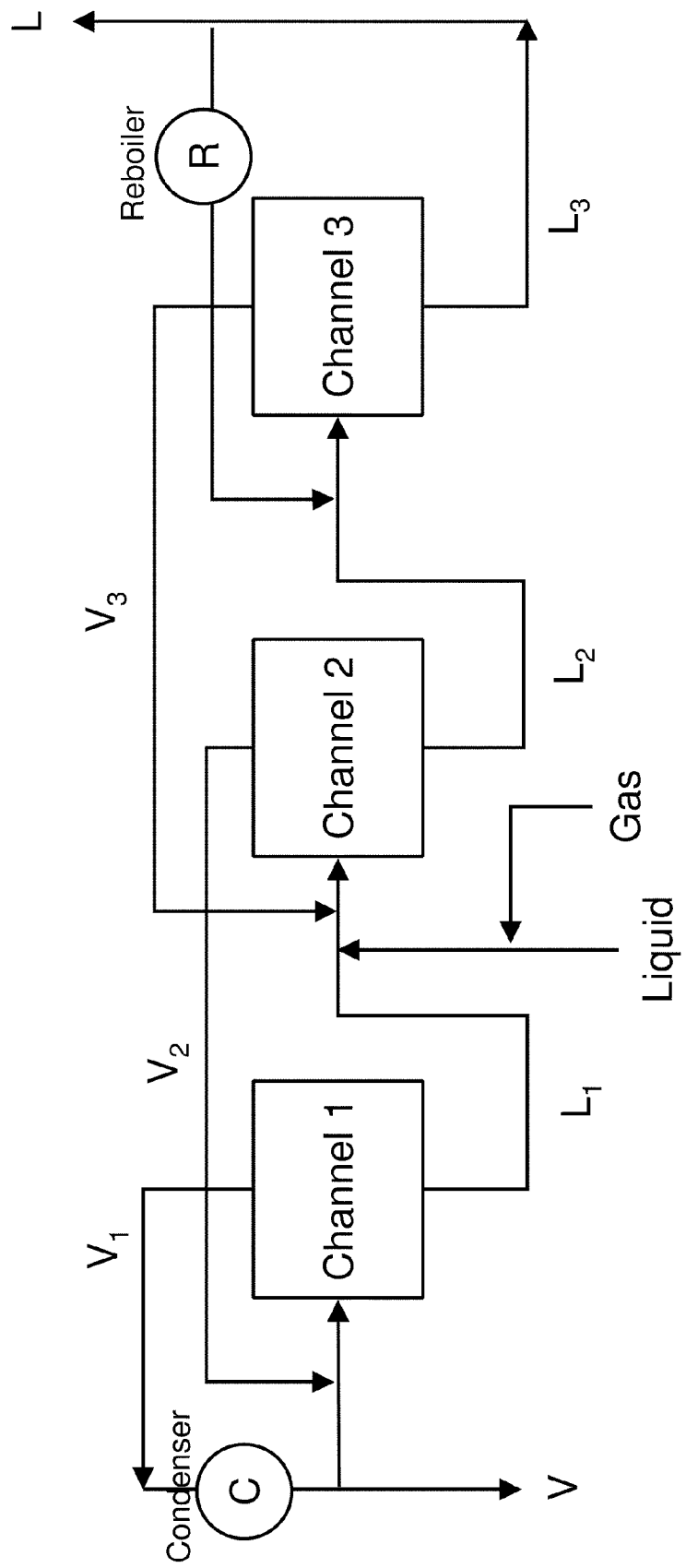

FIG. 3C includes a schematic illustration outlining the operation of a multi-stage, vapor-liquid separation scheme. While the diagram outlines vapor-liquid separation, a similar scheme could be used to perform multi-stage liquid-liquid separations. The separation scheme outlined in FIG. 3C can operate in a similar fashion as a traditional distillation column. In this set of embodiments, a condenser and a reboiler have been included, and each channel can serve as a "plate." Fresh liquid and gas may be fed between any two channels, serving as the analogue of the feed stage in a distillation process. The scheme outlined in FIG. 3C can yield purified liquid and vapor streams, the purity of which depends upon the vapor-liquid behavior of the mixture components as well as the number of stages included in the multi-stage setup.

In some embodiments, multi-phase flow under reduced pressure (i.e. less than atmospheric pressure) or high pressure (i.e. greater than atmospheric pressure) may be used to separate one or more components from a fluid. For example, in some embodiments, the channel may be maintained at a pressure of greater than about 1 atm, greater than about 1.1 atm, greater than about 5 atm, greater than about 10 atm, or higher. In some cases, the channel may be maintained at a pressure of less than about 1 atm, less than about 0.9 atm, less than about 0.5 atm, less than about 0.1 atm, less than about 0.05 atm, less than about 0.01 atm, or lower.

Some embodiments include flashing by nucleation of one or more vapor phases, for example, at channel walls (e.g., at micro-structured surfaces within microchannels). Nucleation of one or more vapor phases may be used, in some cases, to form bubbles or slugs, which may be transported through the channel in accordance with the invention. For example, a gas may be dissolved in a first fluid, and upon nucleation, the dissolved gas may nucleate to form a bubble or a slug within the first fluid. In some cases, nucleation of one or more vapor phases may be achieved using ultra-sonic or acoustic forces, optical forces as concentrated light or lasers, particle seeding such as disburse solids that are porous and enclosed in a gas phase, or using chemical additives such as surfactants that reduce surface tension forces.

In some embodiments, the separation techniques described herein may be carried out as a batch or continuous process. Examples of unit operations utilizing the disclosed invention include, but are not limited to, separation, purification, reaction, washing, heat exchange and stripping processing involving solvents, reactants, products, reagents, gases, catalysts and combination thereof.

As described herein, the first and second fluids may be separated from each other to produce two streams of fluids in some embodiments. In some cases, the first and second fluids may be separated on the basis of surface tension differences. For example, a first fluid may be separated from a second fluid by providing a separating device in fluid communication with the conduit through which the first and second fluid are transported. The separating device may include at least one separator channel in fluid communication with the channel through which the first and second (or more) fluids are transported. The at least one separator channel may be pre-wetted with the first fluid so as to hold a column of the first fluid. As the co-flowed first and second fluids flow by the separation device, the first fluid may flow through the at least one separator channel, and the second fluid may be excluded from the at least one separator channel, thereby separating at least a portion of the first fluid from the second fluid. The separation device may be oriented in any manner, for example, the separation device may communicate with the channel through a side wall of the channel. In other embodiments, the separation device may communicate with the channel thought an upper wall of the channel. In some cases, the at least one separator channel comprises of plurality of channels. In some embodiments, the separator may be used to separate a first liquid from a second liquid. The separator may be used, in some instances, to separate a liquid from a gas. Systems and methods for the separation of multi-phase fluid flow is described in detail in International Patent Application Serial No. PCT/US2006/026464 entitled "Microfluidic Separators for Multiphase Fluid-flow based on Membranes" by Jensen et al., published on Jan. 11, 2007, which is incorporated herein by reference in its entirety.

As described herein, two or more fluids may be transported through a channel via multi-phase flow in some embodiments. As used herein, "multi-phase flow" comprises flow regimes in which at least a first fluid and at least a second fluid, and in some cases, a third fluid, a fourth fluid, etc. are simultaneously transported through a channel while remaining largely separate from the other fluids. Each fluid within the multi-phase flow regime may have distinct chemical and/or physical properties. For instance, each of the fluids may independently be different types of liquid (e.g., immiscible liquids). As another example, one or more fluids may comprise a gas, while one or more other fluids may comprise a liquid.

Contact between a first fluid and second fluid may be maintained using a variety of flow configurations. For example, the two fluids may be transported through a channel via segmented flow (e.g., FIGS. 1-2). The term "segmented flow" is given its normal meaning in the art and is used to refer to the regime in which slugs of a first fluid are transported through a channel in combination with a second fluid while the first and second fluids remain separate fluids. Two fluids are said to be transported "in combination" when they travel in substantially the same direction (i.e., co-current flow). The term "slug" as used herein, refers to an isolated portion of a first fluid that is surrounded by a second fluid, where the first and second fluids remain separated on the time scale of use of the device of the invention, and the largest cross-sectional dimension of the slug is at least about 50% of the largest cross-sectional dimension of the fluid stream in which the slug is transported. In some embodiments, as shown in FIGS. 1-2, the largest cross-sectional dimension of the slugs may be comparable to (e.g., at least 80% of, at least 90% of) the largest cross-sectional dimension of the channel through which they are transported. In some embodiments, the slugs may be transported in a regular, controllable interval within the channel.

The two or more fluids may also be transported through the channel via bubbling flow. In the bubbling flow regime, bubbles of a first fluid are transported through a channel while dispersed in a second fluid. In the bubbling flow regime, the bubbles of the first fluid are not necessarily transported in combination with the second fluid: the flow between the bubbles and the second fluid may be co-current or counter-current. The term "bubble" as used herein, refers to an isolated portion of a first fluid that is surrounded by a second fluid, where the first and second fluids remain largely separate on the time scale of use of the device of the invention, and the largest cross-sectional diameter of the bubble is less than about 50% of the cross-sectional diameter of the fluid in which the bubble is transported. In some cases, bubbling flow comprises an unstable regime in which bubbles of various sizes are produced with little or no control over the number and sizes of the bubbles formed.

In some instances, a slug or bubble may comprise a fluid that is immiscible with the surrounding fluid. The average diameter of a slug or bubble (and/or of a plurality or series of slugs or bubbles) may be, for example, less than about 1 mm, less than about 500 micrometers, less than about 200 micrometers, less than about 100 micrometers, less than about 75 micrometers, less than about 50 micrometers, less than about 25 micrometers, less than about 10 micrometers, or less than about 5 micrometers in some cases. The average diameter of a slug or bubble may also be at least about 1 micrometer, at least about 2 micrometers, at least about 3 micrometers, at least about 5 micrometers, at least about 10 micrometers, at least about 15 micrometers, at least about 20 micrometers, or at least about 100 micrometers in certain cases.

In other embodiments, two or more fluids are transported through the channel via sheath flow. The term "sheath flow" is one that is recognized in the art and refers to a flow regime in which a first continuous stream of fluid (i.e. a core fluid) is surrounded by a second distinct fluid (i.e. a cladding fluid) forming a continuous fluid-fluid interface between the two. In the sheath flow regime, the first and second fluids may be transported in combination with each other (i.e., they are transported through the channel in the same direction), or they may be transported via counter-current flow. Counter-current sheath flow may be achieved, for example, by modifying the hydrophobicity or hydrophilicity of the channel. In some instances, the core and cladding fluids may both comprise liquids. In other cases, the core fluid comprises a gas while the cladding fluid comprises a liquid.

In one set of embodiments separation may be achieved using sheath flow. For example, a first fluid (e.g., a vapor phase) may be transported though the channel while surrounded by a second fluid (e.g., a liquid phase) that comprises two components with different boiling points. The first and second fluids may form a continuous interface along the length the channel. As the two fluids are transported through the channels the more volatile component within the second fluid may be transported across the fluid-fluid interface from the second fluid into the first fluid. Eventually, equilibrium may be achieved, at which point no further net transport of the first component occurs from the second fluid to the first fluid.

Those of ordinary skilled in the art will be aware of additional flow regimes suitable for achieving fluid-fluid contact between the first and second fluids.

As used herein, the term "fluid" generally refers to a substance that tends to flow and to conform to the outline of its container. Typically, fluids are materials that are unable to withstand a static shear stress, and when a shear stress is applied, the fluid experiences a continuing and permanent distortion. The fluid may have any suitable viscosity that permits at least some flow of the fluid. Non-limiting examples of fluids include liquids and gases, but may also include free-flowing solid particles (e.g., colloids, vesicles, etc.), viscoelastic fluids, and the like.

As used herein, the "cross-sectional dimension" of a channel, slug, bubble, or any other article is measured perpendicular to the direction of fluid flow.

As used herein, two fluids are "immiscible," or not miscible, with each other when one is not soluble in the other to a level of at least 10% by weight at the temperature and over the time scale of the separation process.

A "channel," as used herein, means a feature on or in an article (substrate) that at least partially directs the flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least 2:1, more typically at least 3:1, 5:1, or 10:1 or more.

The channel may be of any size, for example, having a largest cross-sectional dimension of less than about 5 mm or 2 mm, or less than about 1 mm, or less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some cases the dimensions of the channel may be chosen such that fluid is able to freely flow through the article or substrate. The dimensions of the channel may also be chosen, for example, to allow a certain volumetric or linear flow rate of fluid in the channel. In some embodiments, the length of the channel may be selected such that the residence times of the first and second (or more) fluids at a predetermined flow rate are sufficient to achieve equilibrium (e.g., vapor-liquid equilibrium). Of course, the number of channels and the shape of the channels can be varied by any method known to those of ordinary skill in the art. In some cases, more than one channel may be used.

In some, but not all embodiments, some or all components of the systems and methods described herein are microfluidic. "Microfluidic," as used herein, refers to a device, apparatus or system including at least one fluid channel having a largest cross-sectional dimension of less than about 1 mm, and a ratio of length to largest cross-sectional dimension perpendicular to the channel of at least 3:1. A "microfluidic channel" or a "microchannel" as used herein, is a channel meeting these criteria. In one set of embodiments, all fluid channels containing embodiments of the invention are microfluidic.

A variety of materials and methods, according to certain aspects of the invention, can be used to form systems such as those described above. For example, in some embodiments, the fluid channels may comprise tubing such as, for example, flexible tubes (e.g., PEEK tubing), capillary tubes (e.g., glass capillary tubes), and the like. In some embodiments, various components can be formed from solid materials, in which microfluidic channels can be formed via micromachining, film deposition processes such as spin coating and chemical vapor deposition, laser fabrication, photolithographic techniques, etching methods including wet chemical or plasma processes, and the like. See, for example, *Scientific American*, 248:44-55, 1983 (Angell, et al). In one embodiment, at least a portion of the fluidic system is formed of silicon by etching features in a silicon chip. Technologies for precise and efficient fabrication of various fluidic systems and devices of the invention from silicon are known. In another embodiment, various components of the systems and devices of the invention can be formed of a polymer, for example, an elastomeric polymer such as polydimethylsiloxane ("PDMS"), polytetrafluoroethylene ("PTFE" or Teflon®), or the like. In some cases, various components of the system may be formed in other materials such as metal, ceramic, glass, Pyrex®, etc.

Different components can be fabricated of different materials. For example, a base portion including a bottom wall and side walls can be fabricated from a transparent or at least partially transparent material, such as glass or a transparent polymer, for observation and/or control of the fluidic process, and a top portion can be fabricated from an opaque material such as silicon or PDMS. Components can be coated so as to expose a desired chemical functionality to fluids that contact interior channel walls, where the base supporting material does not have a precise, desired functionality. For example, components can be fabricated as illustrated, with interior channel walls coated with another material. Material used to fabricate various components of the systems and devices of the invention, e.g., materials used to coat interior walls of fluid channels, may desirably be selected from among those materials that will not adversely affect or be affected by fluid flowing through the fluidic system, e.g., material(s) that is chemically inert in the presence of fluids to be used within the device.

In one embodiment, various components of the invention are fabricated from polymeric and/or flexible and/or elastomeric materials, and can be conveniently formed of a hardenable fluid, facilitating fabrication via molding (e.g. replica molding, injection molding, cast molding, etc.). The hardenable fluid can be essentially any fluid that can be induced to solidify, or that spontaneously solidifies, into a solid capable of containing and/or transporting fluids contemplated for use in and with the fluidic network. In one embodiment, the hardenable fluid comprises a polymeric liquid or a liquid polymeric precursor (i.e. a "prepolymer"). Suitable polymeric liquids can include, for example, thermoplastic polymers, thermoset polymers, or mixture of such polymers heated above their melting point. As another example, a suitable polymeric liquid may include a solution of one or more polymers in a suitable solvent, which solution forms a solid polymeric material upon removal of the solvent, for example, by evaporation. Such polymeric materials, which can be solidified from, for example, a melt state or by solvent evaporation, are well known to those of ordinary skill in the art. A variety of polymeric materials, many of which are elastomeric, are suitable, and are also suitable for forming molds or mold masters, for embodiments where one or both of the mold masters is composed of an elastomeric material. A non-limiting list of examples of such polymers includes polymers of the general classes of silicone polymers, epoxy polymers, and acrylate polymers. Epoxy polymers are characterized by the presence of a three-membered cyclic ether group commonly referred to as an epoxy group, 1,2-epoxide, or oxirane. For example, diglycidyl ethers of bisphenol A can be used, in addition to compounds based on aromatic amine, triazine, and cycloaliphatic backbones. Another example includes the well-known Novolac polymers. Non-limiting examples of silicone elastomers suitable for use according to the invention include those formed from precursors including the chlorosilanes such as methylchlorosilanes, ethylchlorosilanes, phenylchlorosilanes, etc.

Silicone polymers are preferred in one set of embodiments, for example, the silicone elastomer polydimethylsiloxane. Non-limiting examples of PDMS polymers include those sold under the trademark Sylgard by Dow Chemical Co., Midland, Mich., and particularly Sylgard 182, Sylgard 184, and Sylgard 186. Silicone polymers including PDMS have several beneficial properties simplifying fabrication of the microfluidic structures of the invention. For instance, such materials are inexpensive, readily available, and can be solidified from a prepolymeric liquid via curing with heat. For example, PDMSs are typically curable by exposure of the prepolymeric liquid to temperatures of about, for example, about 65° C. to about 75° C. for exposure times of, for example, about an hour. Also, silicone polymers, such as PDMS, can be elastomeric, and thus may be useful for forming very small features with relatively high aspect ratios, necessary in certain embodiments of the invention. Flexible (e.g., elastomeric) molds or masters can be advantageous in this regard.

One advantage of forming structures such as microfluidic structures of the invention from silicone polymers, such as PDMS, is the ability of such polymers to be oxidized, for example by exposure to an oxygen-containing plasma such as an air plasma, so that the oxidized structures contain, at their surface, chemical groups capable of cross-linking to other oxidized silicone polymer surfaces or to the oxidized surfaces of a variety of other polymeric and non-polymeric materials. Thus, components can be fabricated and then oxidized and essentially irreversibly sealed to other silicone polymer surfaces, or to the surfaces of other substrates reactive with the oxidized silicone polymer surfaces, without the need for separate adhesives or other sealing means. In most cases, sealing can be completed simply by contacting an oxidized silicone surface to another surface without the need to apply auxiliary pressure to form the seal. That is, the pre-oxidized silicone surface acts as a contact adhesive against suitable mating surfaces. Specifically, in addition to being irreversibly sealable to itself, oxidized silicone such as oxidized PDMS can also be sealed irreversibly to a range of oxidized materials other than itself including, for example, glass, silicon, silicon oxide, quartz, silicon nitride, polyethylene, polystyrene, glassy carbon, and epoxy polymers, which have been oxidized in a similar fashion to the PDMS surface (for example, via exposure to an oxygen-containing plasma). Oxidation and sealing methods useful in the context of the present invention, as well as overall molding techniques, are described in the art, for example, in an article entitled "Rapid Prototyping of Microfluidic Systems and Polydimethylsiloxane," Anal. Chem., 70:474-480, 1998 (Duffy, et al.), incorporated herein by reference.

In some embodiments, certain microfluidic structures of the invention (or interior, fluid-contacting surfaces) may be formed from certain oxidized silicone polymers. Such surfaces may be more hydrophilic than the surface of an elastomeric polymer. Such hydrophilic channel surfaces can thus be more easily filled and wetted with aqueous solutions.

In one embodiment, a bottom wall of a microfluidic device of the invention is formed of a material different from one or more side walls or a top wall, or other components. For example, the interior surface of a bottom wall can comprise the surface of a silicon wafer or microchip, or other substrate. Other components can, as described above, be sealed to such alternative substrates. Where it is desired to seal a component comprising a silicone polymer (e.g. PDMS) to a substrate (bottom wall) of different material, the substrate may be selected from the group of materials to which oxidized silicone polymer is able to irreversibly seal (e.g., glass, silicon, silicon oxide, quartz, silicon nitride, polyethylene, polystyrene, epoxy polymers, and glassy carbon surfaces which have been oxidized). Alternatively, other sealing techniques can be used, as would be apparent to those of ordinary skill in the art, including, but not limited to, the use of separate adhesives, bonding, solvent bonding, ultrasonic welding, etc.

This following applications are incorporated herein by reference in their entirety for all purposes: U.S. Provisional Patent Application Ser. No. 61/114,975, filed Nov. 14, 2008, entitled "Small-Scale Method and Apparatus for Separating Mixtures," by Hartman, et al. and International Patent Application Serial No. PCT/US2006/026464 entitled "Microfluidic Separators for Multiphase Fluid-flow based on Membranes" by Jensen et al., published on Jan. 11, 2007.

EXAMPLES

The following examples are intended to illustrate certain embodiments of the present invention, but do not exemplify the full scope of the invention.

Example 1

Figure 4:
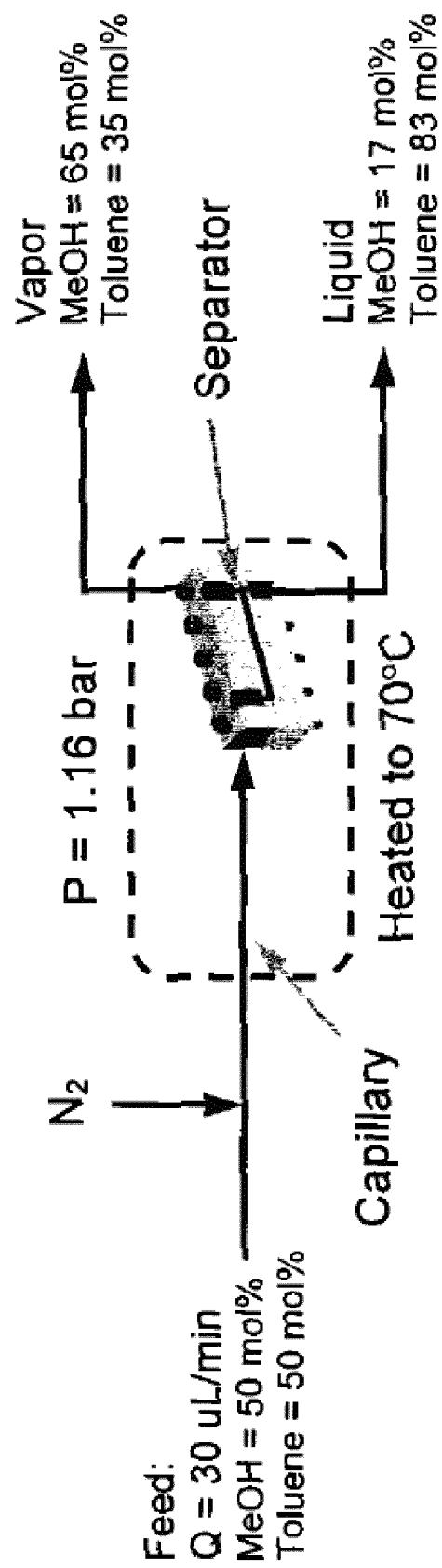
FIG. 4 includes a schematic illustration of a component separation experiment, according to one set of embodiments.

This example illustrates the separation of a two-component mixture into enriched fractions. A feed comprising 50 mol % methanol and 50 mol % toluene was delivered at 30 microliters/minute to a capillary heated to a temperature of 70° C. (greater than the boiling point of methanol of 64° C.). Nitrogen gas was injected at an inlet located upstream of the heated zone but downstream of the liquid inlet, thus enabling segmented flow. As can be seen in FIG. 4, separation of vapor from liquid resulted in methanol mole fractions of 65% and 17%, respectively. For methanol-toluene in equilibrium at 70° C., thermodynamic calculations estimate vapor and liquid mole fractions of 76% and 13%. These results demonstrate conclusively that vapor-liquid equilibrium was achieved continuously, and microdistillation was possible using the method outlined above.

Figure 5B:
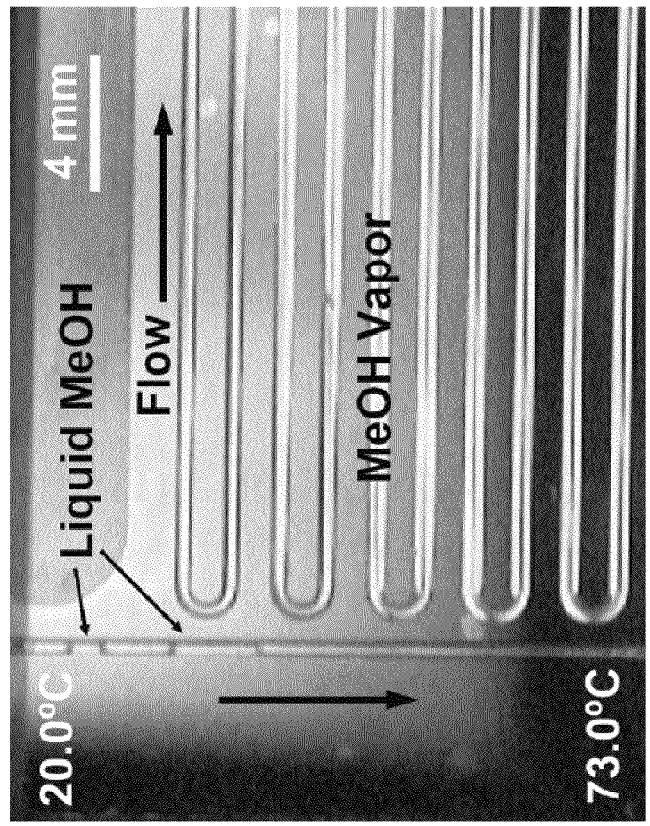
FIGS. 5A-5B include photographs of devices used to separate components, according to one set of embodiments.
Figure 5A:
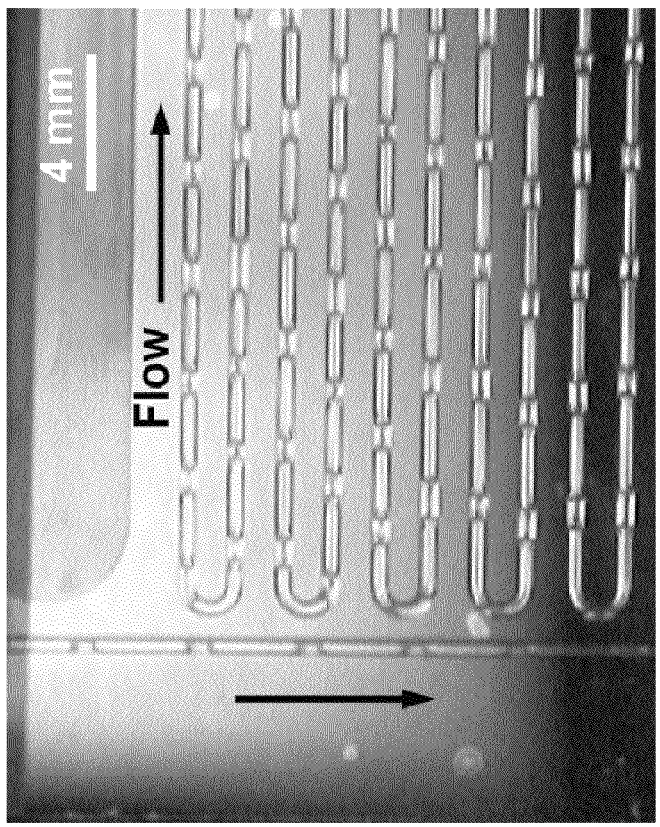

The multiphase flow that enabled controlled flashing of liquid, and in turn distillation, was captured using a microfluidic device. FIG. 5A shows a video frame of methanol-nitrogen segmented flow at 20° C. FIG. 5B illustrates that flashing of methanol was easily controlled by heating the segmented flow to 73° C. As gas-liquid slugs entered the device, the liquid phase was heated above the bubble point, which brought about the complete flashing of methanol into the vapor phase. For multi-component mixtures (e.g., methanol-toluene), the disclosed technology enables partially flashed liquid in equilibrium with vapor because of boiling point differences.

Comparative Example 2

In this example, flashing of pure methanol (MeOH) was studied using a microreactor similar to the device in FIG. 5A. Methanol was injected at a rate of 15 mL/min (at 20.0° C.) until all of the air had been purged from the microreactor. After injecting several residence volumes, the reactor temperature was increased to 85.0° C. (above the normal boiling point of methanol of 64.1° C.), and held constant for 8 hours. Throughout the experiment, methanol remained in the liquid phase and without any vapor formation, behaving as a superheated liquid.

Example 3

Figure 6:
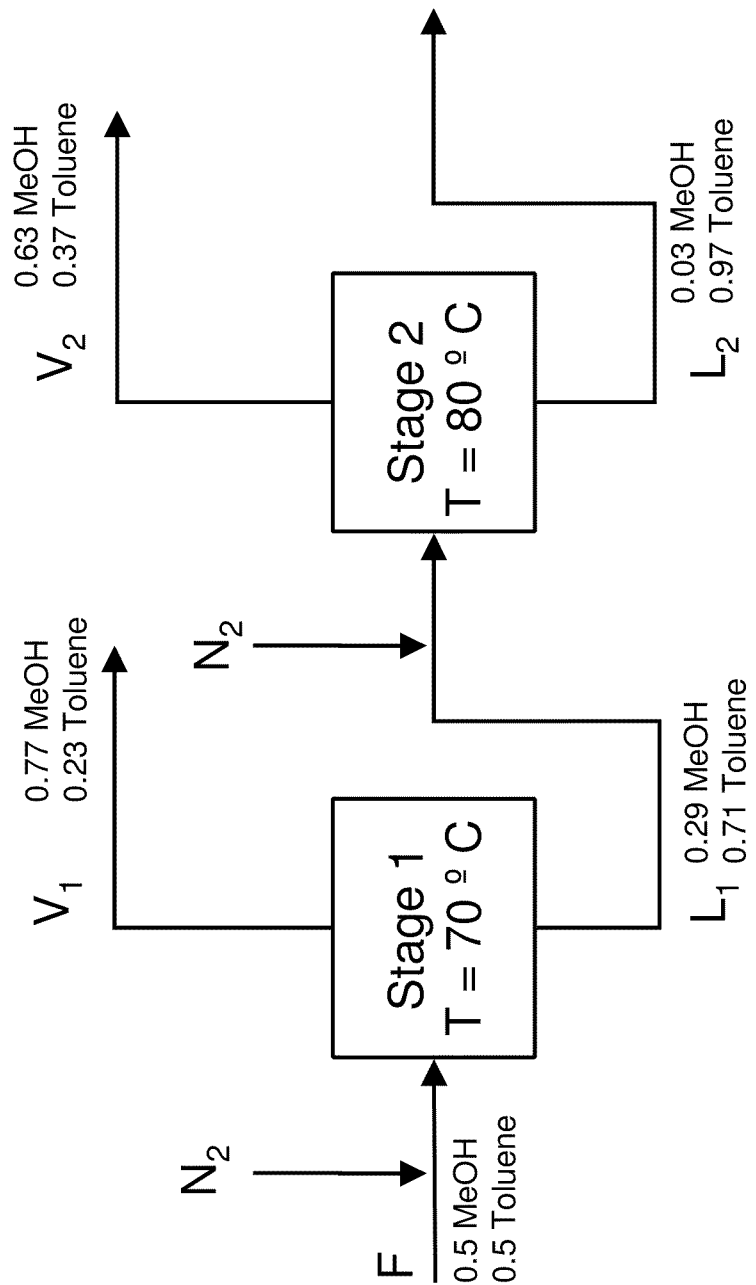
FIG. 6 includes a schematic illustration of a component separation experiment, according to one set of embodiments.

This example illustrates the separation of a two-component mixture into enriched fractions using a two-stage separation apparatus. The experiments outlined in this example were performed by connecting two of the devices described in Example 1 in series. A feed comprising 50 mol % methanol and 50 mol % toluene was delivered at 30 microliters/minute to a capillary heated to a temperature of 70° C. (greater than the boiling point of methanol of 64° C.). Nitrogen gas was injected at an inlet located upstream of the heated zone but downstream of the liquid inlet, thus enabling segmented flow. As can be seen in FIG. 6, separation of vapor from liquid resulted in methanol mole fractions of 77% in the vapor and 29% in the liquid. For methanol-toluene in equilibrium at 70° C., thermodynamic calculations (i.e., McCabe-Thiele analysis) estimated methanol mole fractions of 80% in the vapor and 29% in the liquid.

The bottoms from Stage 1 (denoted $L_1$ in FIG. 6) was fed to a second capillary heated to a temperature of 80° C. Nitrogen gas was injected at an inlet located upstream of the heated zone but downstream of the liquid inlet, thus enabling segmented flow. As shown in FIG. 6, separation of vapor from liquid resulted in methanol mole fractions of 63% in the vapor and 3% in the liquid. For methanol-toluene in equilibrium at 70° C., thermodynamic calculations estimated methanol mole fractions of 63% in the vapor and 5% in the liquid.

Example 4

Figure 7:
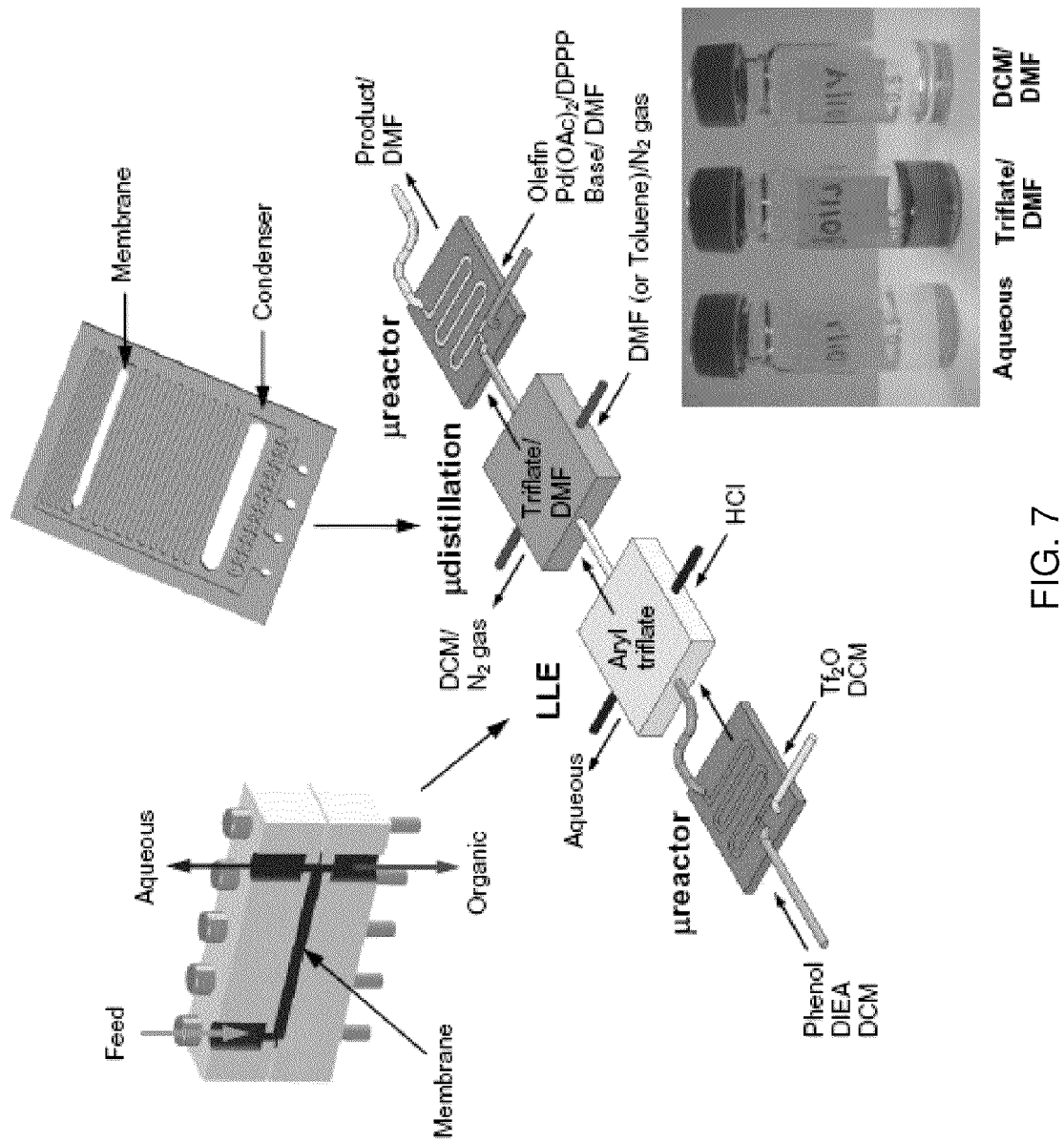
FIG. 7 includes a schematic illustration of an exemplary system and a photograph of exemplary fluids, according to one set of embodiments.

This example describes the use of microfluidic distillation in a multi-step chemical synthesis system to exchange reaction solvents (FIG. 7).

The Heck reaction is a versatile transformation in organic chemistry that finds applications in the production of active pharmaceutical ingredients, natural product synthesis, and fine chemical production. In addition to aryl halides, aryl triflates and nonaflates can be used as coupling partners to extend the scope of the reaction to a wider range of starting materials and to access regioisomeric products. Because of this, examples of Heck reactions with aryl triflates are common; however, the almost complete lack of commercial availability of aryl triflates necessitates their preparation prior to their use in Heck reactions.

Triflates are commonly prepared in chlorinated solvents from phenols and trifluoromethanesulfonic anhydride using stoichiometric amine bases. After the reaction, a general workup procedure can include removal of the chlorinated solvent and addition of another solvent such as ethyl acetate (EA) to facilitate the workup. Liquid-liquid extraction of the reaction mixture with aqueous acid, base and brine to remove salt byproducts and excess reagents, followed by removal of the solvent and often purification of the triflate. In the second reaction step, the purified triflate, alkene coupling partner, amine base, palladium precatalyst and ligand are combined in a polar aprotic solvent, such as DMF, and heated to 100° C. or higher for the duration of the reaction (see FIG. 8).

In this example, microreactors were used to perform this chemistry. The reaction process was generally performed as outlined in FIG. 7. The first reaction step, the synthesis of an aryl triflate from a phenol and triflic anhydride (see FIG. 8), was carried out in a microreactor as illustrated in FIG. 7. A DCM solution of the substrate (1.0 M), base (1.5 M DIEA) and internal standard (0.2 M) was loaded into a syringe and a DCM solution of $Tf_2O$ (1.2 M) was loaded into a separate syringe (Hamilton Gastight 2.5 mL) and delivered to the first microreactor using a Harvard Apparatus syringe pump (3 to 4 µL/min). The syntheses of two different aryl triflates were investigated at 20° C.: 4-tert butylphenyl trifluoromethanesulfonate and (S)-1,1'-binaphthyl-2,2'-diyl bis(trifluoromethanesulfonate).

Upon exiting the microreactor, the product was combined with 2.0 M hydrochloric acid (HCl) using a Harvard Apparatus syringe pump (24 µL/min) and segmented flow was established. Side-by-side contact of HCl slugs with the organic phase enhanced mass transport of DIEA to the aqueous droplets, allowing for a single-stage liquid-liquid extraction.

As shown in the reaction sequence of FIG. 7, purified aryl triflate exiting the liquid-liquid extraction was combined with pure toluene (or DMF) using a Harvard Apparatus syringe pump (24 µL/min). The resulting stream (with a DCM-to-toluene volumetric ratio of 1:4) was then delivered to the microfluidic distillation device (FIG. 7). Gas-liquid segmented flow was established by combining nitrogen gas with the liquid stream, which enabled controlled flashing. Nitrogen gas was delivered to the microdistillation stage directly from a gas tank fitted with a regulator. The temperature of the distillation device (70° C.) was maintained above the boiling point of DCM (about 40° C.) yet below the boiling point of toluene (about 110° C.) or DMF (about 153° C.). Consequently, the vapor phase was enriched with DCM while the liquid phase included mostly toluene (or DMF) and aryl triflate. The liquid and vapor phases were further separated by exploiting the differences in their surface tensions. The device was designed such that the liquid (i.e., reaction products and solvent) flowed through an integrated PTFE membrane (0.5 micron pore size) while the vapor did not.

In addition to the multi-step experiment, samples of the aqueous phase, vapor condensate and product streams were collected after the distillation stage for analysis. A photograph of a set of these samples is shown in FIG. 7. The distillate was substantially colorless while the product stream was orange-brown. NMR analysis confirmed that the triflate remained in the liquid product stream in the case of DCM-to-toluene solvent exchange, and that the starting material was converted to the triflate in 91-95% yield. The analysis also identified that 93% of the DIEA was extracted into the aqueous phase while the remaining 7% was in the liquid product stream. The vapor condensate exiting the distillation stage contained mostly DCM and toluene as confirmed by NMR analysis.

Figure 9:
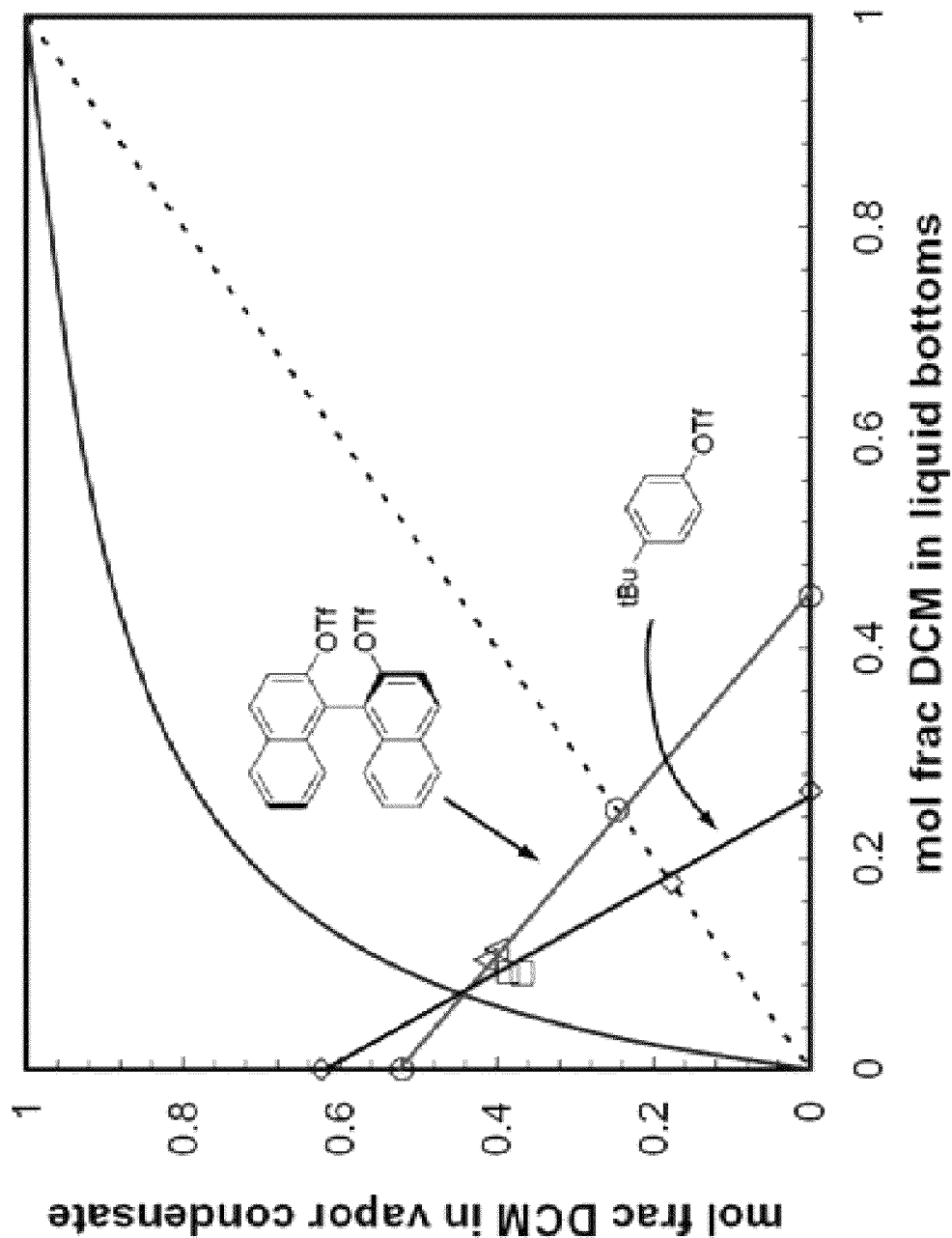
FIG. 9 includes an exemplary plot of the mole fraction of DCM in a vapor condensate as a function of the mole fraction of DCM in a liquid bottoms, according to one set of embodiments.

When a liquid mixture includes two or more components with different volatilities, a phase equilibrium of the varying compositions exists and can be represented by a McCabe-Thiele diagram. FIG. 9 shows the McCabe-Thiele diagram for the DCM-toluene solvent exchange that was studied in this example.

In FIG. 9, the theoretical equilibrium of a DCM-toluene binary mixture (at 70.0° C.) is indicated by the curved line. The straight lines represent the mass balance during the separation of DCM and toluene for both triflate syntheses. For the synthesis of (S)-1,1'-binapthyl-2,2'-diyl bis(trifluoromethanesulfonate) (BINOL-triflate), we observed that DCM compositions of 0.11±0.01 (liquid product stream) and 0.41±0.01 (vapor condensate stream) were close to those predicted by the equilibrium diagram (triangles in FIG. 9). Similarly, values of 0.09±0.01 (liquid product stream) and 0.38±0.01 (vapor condensate stream) were measured during the synthesis and separation of 4-tert-butylphenyl triflate (squares in FIG. 9). Analysis of FIG. 9 also shows that the DCM content of the feed stream was reduced from 0.2 (or 0.25 for BINOL-triflate) to 0.1 mol fraction. Thus, diluting the product stream from the first reaction step and carrying out one distillation step resulted in a switch of the solvent composition from 100% DCM to 90:10 toluene:DCM.

Figure 10:
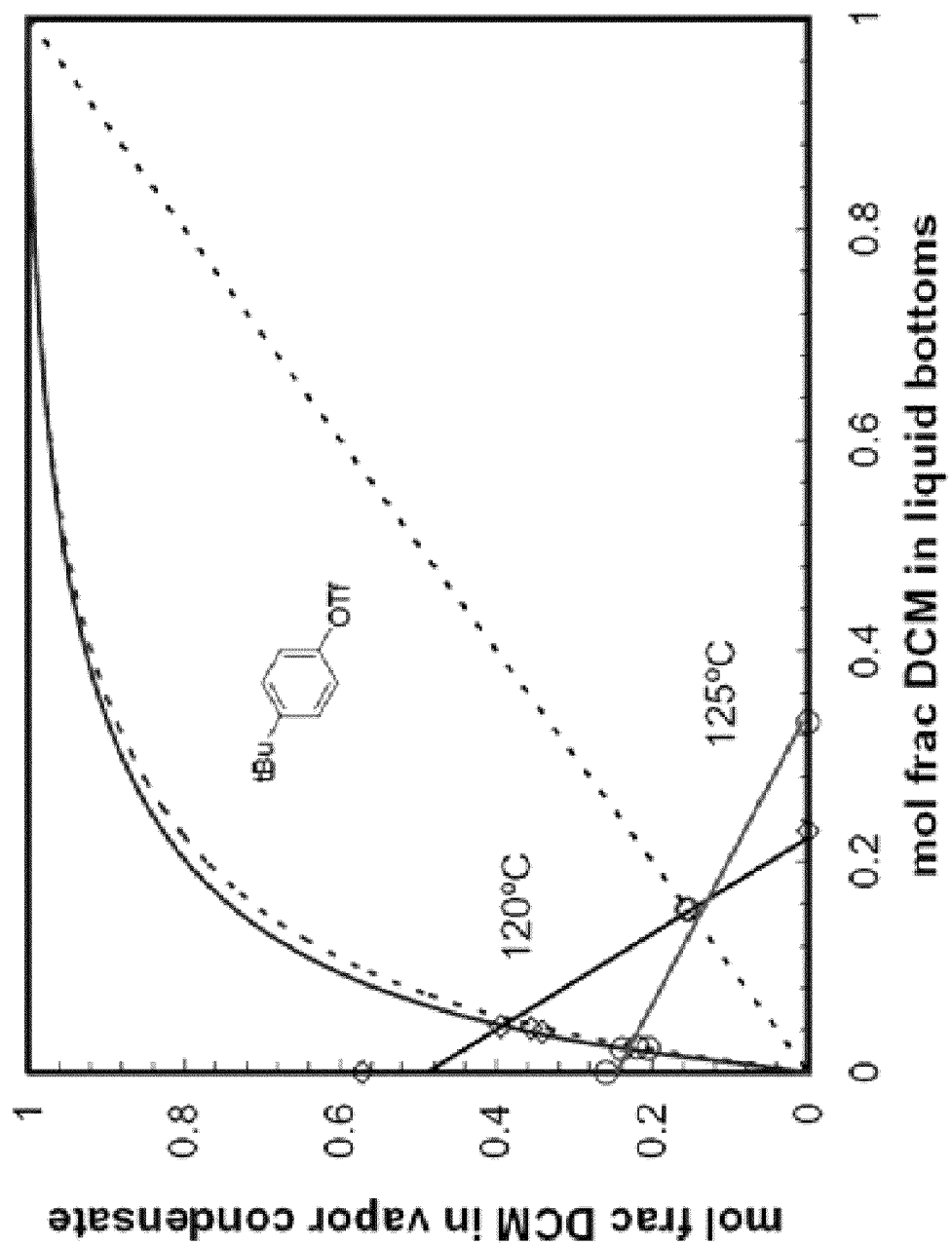
FIG. 10 includes an exemplary plot of the mole fraction of DCM in a vapor condensate as a function of the mole fraction of DCM in a liquid bottoms, according to one set of embodiments.

The synthesis of 4-tert-butylphenyl trifluoromethanesulfonate and subsequent solvent exchange from DCM to DMF was also investigated (FIG. 10). It was observed that increasing the distillation temperature from 120° C. to 125° C. resulted in a large change in operation. At 120° C., the slope of the operating line (i.e., the ratio of molar flow rate of liquid stream to vapor condensate) was >1; however, at 125° C. the slope was <1. Such control over flow rates can be advantageous for continuous-flow chemical processes. Adjusting temperature alone can potentially change the outcome of the downstream microchemical process. Trace amounts of aryl triflate (<0.3 mol %) were found in the vapor condensate collected during solvent exchange from DCM to DMF, implying that operation at higher temperatures resulted in product vaporization. Calculation of the total molar flow rates through the system revealed that the mol fraction of aryl triflate vaporized, f, ranged from 0.07 to 0.22. Loss of product in a chemical process is undesirable in many cases, but can potentially be minimized using a more selective separation process. For example, multi-stage distillation would enable lower operating temperatures, maximizing solvent separation, and minimizing product losses.

In the final reaction step (see FIG. 8), a palladium-catalyzed coupling of 4-tert-butylphenyl triflate with n-butyl vinyl ether was carried out by combining the product stream exiting the microfluidic distillation stage with the other reagents and a catalyst in a downstream microreactor at 125° C. (see FIG. 7). The extent of reaction was determined by analyzing the samples exiting the microreactor. Table 1 shows the residence time, DCM composition, conversion of aryl triflate, and yield of the Heck product with increasing distillation stage temperature.

TABLE 1

Residence time, DCM composition, conversion, and yield as a function of distillation temperature

| T (° C.) | Residence Time (min) | DCM (vol %) | Conversion ± s.d.[a] (%) | Yield ± s.d.[a] (%) |
|---|---|---|---|---|
| 110 | 5.1 | 9.6 | 47.1 ± 8.7 | 42.8 ± 5.9 |
| 120 | 5.5 | 7.1 | 67.6 ± 4.5 | 57.5 ± 4.1 |
| 125 | 8.1 | 6.0 | 96.3 ± 0.4 | 76.8 ± 0.7 |

[a]s.d. = standard deviation for three samples

Figure 8:
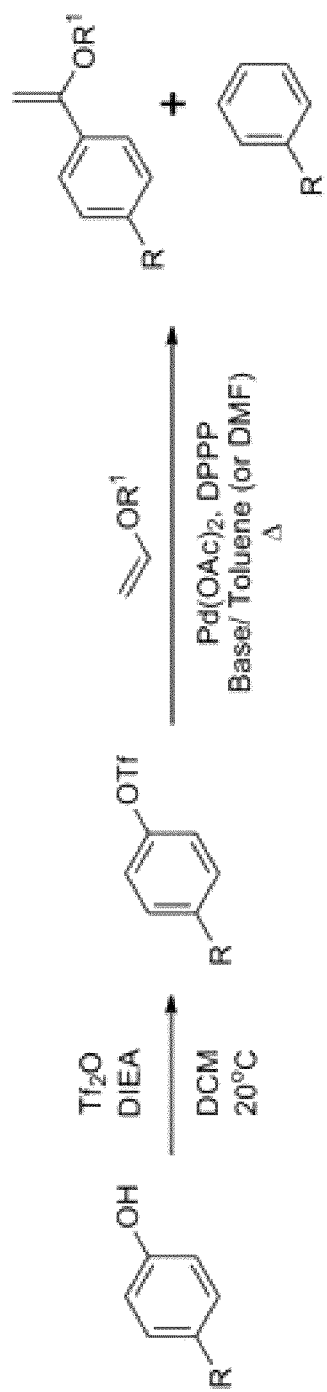
FIG. 8 includes a schematic illustration of a reaction scheme, according to one set of embodiments.
Figure 11:
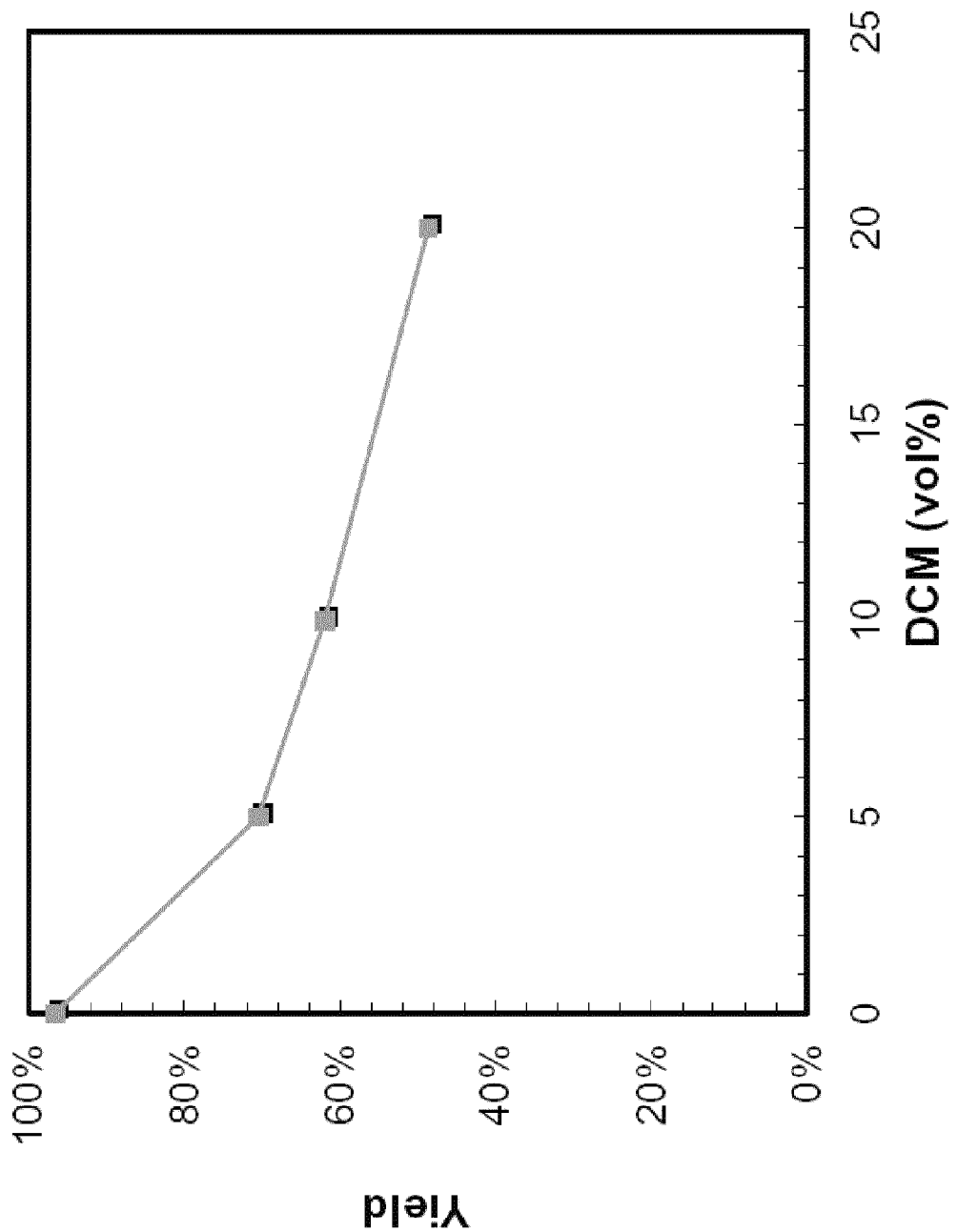
FIG. 11 includes a plot of yield as a function of DCM volume percentage, according to one set of embodiments.

Increasing the temperature increased the amount of volatile solvent separated from the product stream, which decreased the volume fraction of DCM, increased the concentration of the triflate, and decreased the flow rate of the product stream. Concentrating the aryl triflate entering the final reactor increased the reaction rate while decreasing the total flow rate resulted in a longer residence time for the reaction (Table 1). Batch experiments were performed to determine the influence of residual DCM on the Heck reaction. FIG. 11 shows that the reaction was particularly efficient in substantially pure DMF and increasing the fraction of DCM decreased the product yield, which was in agreement with the results in flow. As shown in FIG. 8, reduction of the triflate was also observed during the Heck reaction. The selectivity for the Heck product relative to the reduced product remained constant and was estimated to be ~15:1.

Continuous operation of the process described in this example could produce uninterrupted quantities of 1-(1-butoxyvinyl)-4-tert-butyl benzene. Based on the data reported in Table 1, and the residence times investigated, approximately 40 to 50 mg/hr (or 0.19 to 0.21 mmol/hr) of product could be synthesized.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of at least partially separating components, comprising:
passing a first fluid through a microchannel essentially free of interior microchannel surface irregularities, through a first inlet of the microchannel, wherein the first fluid comprises a first component with a first boiling point and a second component with a second boiling point that is higher than the first boiling point;
passing a second fluid, largely separate from the first fluid, through the microchannel as a series of slugs in a segmented flow configuration with the first fluid, through a second inlet of the microchannel;
flowing the fluids through the microchannel;
heating the fluids within the microchannel to a temperature at or above the boiling point of the first component, allowing at least some of the first component to be transferred from the first fluid to the second fluid; and
separating at least a portion of the first fluid from the second fluid.

2. The method of claim 1, further comprising:
passing the first fluid through a second microchannel, wherein the first fluid comprises the first and second components;
passing a third fluid, largely separate from the first fluid, through the second microchannel in combination with the first fluid; and
heating the first and third fluids within the second microchannel to a temperature at or above the boiling point of the first component, thereby transferring at least some of the first component to the third fluid.

3. The method of claim 2, further comprising heating the fluids within the second microchannel to a temperature at or above the boiling point of a third component in the first fluid, thereby transferring at least some of the third component to the second fluid.

4. The method of claim 2, further comprising heating the fluids within the second microchannel to a temperature above the boiling point of the first component, but below the boiling points of the second component and a third component in the first fluid.

5. The method of claim 1, wherein the first boiling point and the second boiling point are within 10° C.

6. The method of claim 1, wherein the first boiling point and the second boiling point are within 5° C.

7. The method of claim 1, wherein the first boiling point and the second boiling point are within 1° C.

8. The method of claim 1, wherein the first boiling point and the second boiling point are within 0.5° C.

9. The method of claim 1, wherein the microchannel is maintained at a pressure of less than about 0.9 atm.

10. The method of claim 1, wherein the microchannel is maintained at a pressure of less than about 0.5 atm.

11. The method of claim 1, wherein the microchannel is maintained at a pressure of less than about 0.1 atm.

12. The method of claim 1, wherein the microchannel is maintained at a pressure of greater than about 1.1 atm.

13. The method of claim 1, wherein the microchannel is maintained at a pressure of greater than about 5 atm.

14. The method of claim 1, wherein the microchannel is maintained at a pressure of greater than about 10 atm.

15. The method of claim 1, wherein the first fluid is a liquid.

16. The method of claim 1, wherein the second fluid is a gas.

17. The method of claim 1, wherein the second fluid is a liquid.

18. The method of claim 1, wherein the first component is a product of a reaction within the first fluid.

19. The method of claim 1, wherein the Bond number of a system is less than about 1.

20. The method of claim 1, wherein the first boiling point and the second boiling point are within 25° C.

21. The method of claim 1, wherein separating at least a portion of the first fluid from the second fluid comprises separating the two fluids on the basis of surface tension differences.

22. The method of claim 1, wherein separating at least a portion of the first fluid from the second fluid comprises separating two liquids.

23. The method of claim 1, wherein separating at least a portion of the first fluid from the second fluid comprises separating a liquid and a gas.

24. The method of claim 1, wherein the first and second inlets are the same.

25. The method of claim 1, wherein the first and second inlets are different.

26. The method of claim 1, wherein the first and second components are substantially absent from the second fluid prior to heating the first and second fluids.

27. The method of claim 1, wherein the second fluid comprises a component that is substantially immiscible with the first fluid.

* * * * *